United States Patent [19]

Landhuis

[11] Patent Number: 5,152,275
[45] Date of Patent: Oct. 6, 1992

[54] STONE SPLITTER

[75] Inventor: Jan J. Landhuis, Vriezenween, Netherlands

[73] Assignee: ALMI Machinefabriek B.V., Vriezenveen, Netherlands

[21] Appl. No.: 644,544

[22] Filed: Jan. 23, 1991

[30] Foreign Application Priority Data

Feb. 17, 1990 [DE] Fed. Rep. of Germany ....... 4005071

[51] Int. Cl.⁵ .............................................. B28D 1/02
[52] U.S. Cl. .................................. 125/12; 125/16.01; 125/23.01
[58] Field of Search ................... 125/23.01, 12, 16.01, 125/16.03, 16.04, 18

[56] References Cited

FOREIGN PATENT DOCUMENTS

| 2254989 | 3/1974 | Fed. Rep. of Germany . |
| 2815744 | 11/1982 | Fed. Rep. of Germany . |
| 3446768 | 7/1986 | Fed. Rep. of Germany ... 125/23.01 |
| 37925 | 2/1931 | France ............................... 125/23.01 |
| 1387935 | 3/1975 | United Kingdom ............. 125/23.01 |

Primary Examiner—M. Rachuba
Attorney, Agent, or Firm—Merchant, Gould, Smith, Edell, Welter & Schmidt

[57] ABSTRACT

The invention relates to a stone breaker having a frame supporting the work-table, having a support which is height-adjustable via setting means at its outer ends and is supported by the frame, and having knife-type blades extending parallel to the support, of which blades the counter-blade is supported by the frame and the other, in contrast to the support, is movable towards the counter-blade by means of a lever device, two eccentric drives with eccentric wheels being actuated by the lever device, both eccentric wheels having an outer toothed wheel rim and both outer toothed wheel rims being connected to each other via a movable rack.

4 Claims, 2 Drawing Sheets

STONE SPLITTER

BACKGROUND OF THE INVENTION

1. Field of the Invention

The invention relates to a stone splitter according to the preamble of the main claim.

2. Description of the Prior Art

A generic stone splitter is described in DE-28 15 744 C2 and has proved excellent in practice.

It is also known (as shown particularly clearly by DE-OS 22 54 989) to produce the power transmission to the cutter by means of two eccentrics disposed at the end regions of the cutter. A hand lever is connected non-rotationally to one eccentric, while the other eccentric is operatively connected to the hand lever by means of a rod coupled to the hand lever and to a further lever connected non-rotationally to the latter eccentric.

Such an arrangement means that essentially equal pressure is produced in both axial end regions of the cutters upon operation of the hand lever, which is very important in particular when individual cutters, rather than continuous cutters, are used.

This stone splitter does, however, have the disadvantage that a multiplicity of pivot bearing points is present, which points tend to show wear in the course of the rough operation of a stone splitter, in particular due to the fact that, during the tension release arising immediately after the cut, a shock is carried into all articulated parts.

SUMMARY OF THE INVENTION

The object of the invention is to improve the drive of a stone splitter, in order thereby to increase the service life of the stone splitter.

This object of the invention is achieved through the teaching of the main claim.

Advantageous embodiments are explained in the subclaims.

In other words, it is proposed that an eccentric drive be used, comprising two eccentric wheels which are connected to each other for drive purposes by means of a toothed rack. The lever device in this case engages with the one eccentric wheel, the eccentric wheel being equipped with external toothing. Through the rotary movement of the eccentric wheel which has taken place, and during which the upward or downward movement of the blade-holder also takes place simultaneously, the toothed rack is now carried along by means of the external toothing, and the external toothing of the second eccentric drive is set in rotation by means of the toothed rack. This, therefore, also produces a pressure force downwards on the blade holders in the region of this second eccentric drive not driven directly by means of the lever device.

The toothed rack in this case advantageously rests inside the upward and downward movable blade holder on a supporting plate, with the interposition of suitable plain bearings, which can be made of, for example, plastic, or can also be in the form of roller bearings.

The cutters are advantageously in the form of individual cutters as known per se, and these individual cutters rest in a manner known per se on the blade holder with the interposition of rubber pads.

BRIEF DESCRIPTION OF THE DRAWINGS

An example of an embodiment of a stone splitter according to the invention is explained below with reference to the drawings. The drawings in this case show in.

DESCRIPTION OF THE PREFERRED EMBODIMENT

Figure 1:
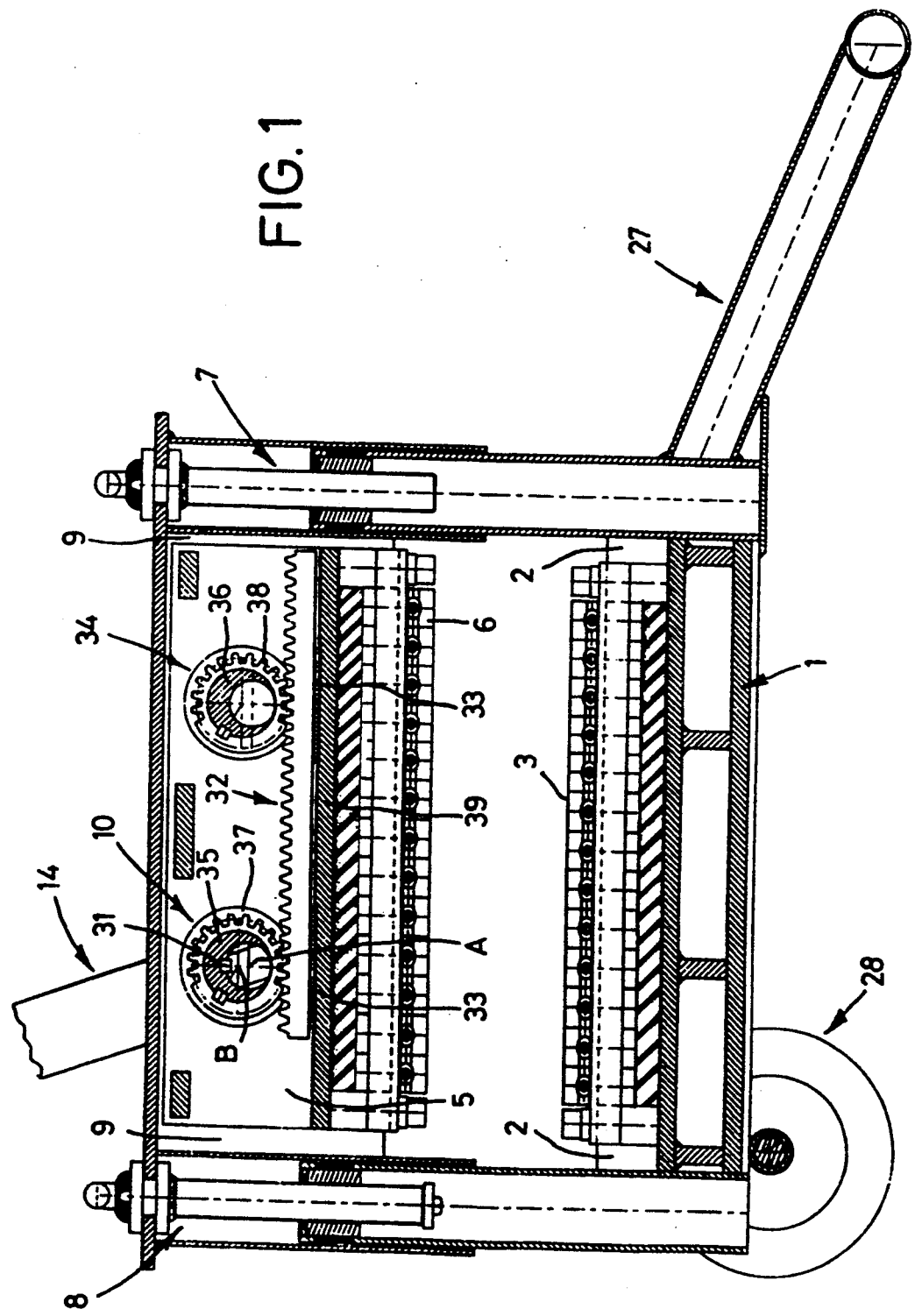
FIG. 1 a cut-away side view of a stone splitter according to the invention, and in FIG. 2 a section through the stone splitter according to FIG. 1.

The stone splitter shown in the drawings has a frame 1, which can be equipped with a foot support 27 and a pair of wheels 28. The frame 1 bears a blade holder 2 with individual cutters 3, which are fixed on the blade holder 2 by means of fixing devices 4. These individual cutters 3 act as countercutters.

An upper blade holder 5 bears individual cutters 6. The two individual cutters 3 and 6 can be moved towards each other in a common plane through the blade holder 5 being moved downwards, in which case it is also possible to adjust the blade holder 5 in height.

The adjustment of the blade holder 5 in height is carried out by adjusting devices 7 and 8 which bear a carrier 9, bearing the actual blade holders 5 in such a way that they can be moved up and down. The movement of the blade holder 5 is achieved by means of an eccentric drive 10, which can be operated by means of a lever device 14.

A work table 24 formed by a bearing plate is disposed at approximately the height of the cutting face of the interacting individual cutters 3 and 6, and during use bears the stone material to be split. The bearing plate is in this case flexibly supported, as indicated by the spring bearing 25, 26.

Figure 2:
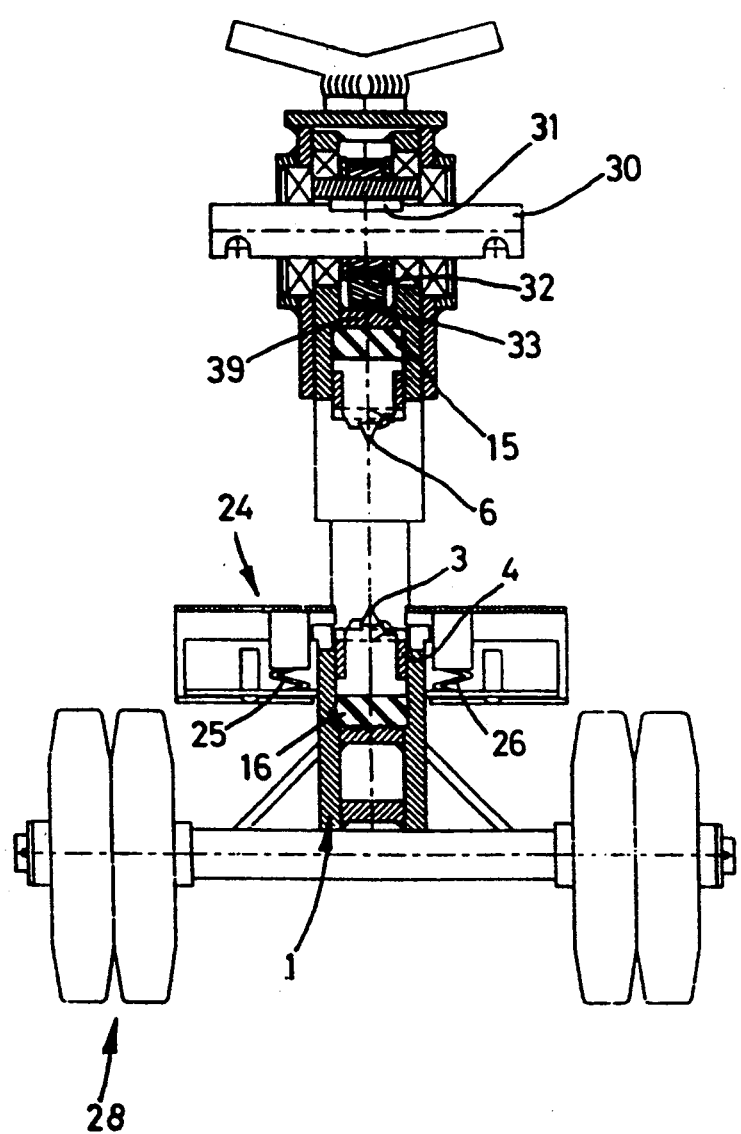

FIG. 2 shows a shaft 30, to which the lever device 14, which can be seen in FIG. 1, connects in a forked manner. An eccentric wheel 35 is non-rotationally supported on the shaft 30 through a suitable keyed joint 31 being provided between the two components. The axis of rotation of the shaft 30 is shown at A in FIG. 1, while the axis of rotation of the eccentric wheel 35 is shown by B in FIG. 1.

The outside of the eccentric wheel 35 has an external toothed ring 37, and it can be seen from the illustration in FIG. 1 in conjunction with the illustration in FIG. 2 that when the shaft 30 is rotated by means of the lever device 14 the eccentric wheel 35 also carries out a corresponding rotary movement, but in this case rotates eccentrically about the axis of rotation A, so that a downward pressure can thereby be produced.

This downward pressure acts by means of a toothed rack 32 on a supporting plate 39, which is disposed in a fixed manner in the blade holder 5, so that the actual individual cutters 6 can thereby be moved downwards. The pressure transmission in this case takes place with the interposition of rubber pads 15.

In the individual cutters 3 of the lower blade are the same way also supported in a fixed manner on the frame 1 by means of rubber pads 16.

It can be seen from the illustration in FIG. 1 that the eccentric drive 10 connected to the lever device 14 is disposed off-center inside the actual stone splitter, and in fact off-center viewed in the direction of the axis of the cutters, and provision is made for a second eccentric drive 34, which also comprises an eccentric wheel 36 having an external toothed ring 38. This external toothed ring 38 meshes with the toothed rack 32, and it can be seen from this that when the eccentric wheel 35 carries out a rotary movement the eccentric wheel 36 of the eccentric drive 34 is forced by means of the toothed rack 32 also to carry out a rotary movement.

Since both the turned wheels 35 and 36 are eccentric wheels, the toothed rack 32 is thus moved downwards also in the region of the eccentric drive 34, and this means that a uniform pressure is exerted on the individual cutters 6 over the entire length of the individual cutters 6.

The toothed rack 32 rests in this case on the supporting plate 39 with the interposition of plain bearings 33.

I claim:

1. A stone splitter comprising:
   a work table;
   a frame bearing the work table;
   a carrier having two ends;
   adjusting devices supporting the table at its outside ends, in a vertically adjustable manner, from the frame;
   blade-like cutters running parallel to the carrier;
   a countercutter supported by the frame;
   a lever device for moving the blade-like cutters opposite the carrier towards the countercutter; and
   two eccentric drives with eccentric wheels, wherein at least one eccentric drive is operated by the lever device, both eccentric wheels having an external toothed ring, and both external toothed rings being connected to each other by means of a movable toothed rack.

2. The stone splitter as claimed in claim 1, further comprising a blade holder having supporting plate therein, wherein the toothed rack is disposed movably in the direction of the longitudinal axis of the cutters by means of plain bearings on the supporting plate.

3. The stone splitter as claimed in claim 1 or 2, wherein the blade-like cutters are formed by individual cutters which are supported on rubber pads.

4. The stone splitter as claimed in claim 2, wherein the blade-like cutters are formed by individual cutters which are supported on rubber pads.

* * * * *